(12) United States Patent
Anderson et al.

(10) Patent No.: US 8,039,517 B2
(45) Date of Patent: Oct. 18, 2011

(54) COLLOIDAL PARTICLE SOLS AND METHODS FOR PREPARING THE SAME

(75) Inventors: Lawrence G. Anderson, Allison Park, PA (US); Debra L. Singer, Wexford, PA (US); Thomas R. Hockswender, Gibsonia, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 834 days.

(21) Appl. No.: 11/001,543

(22) Filed: Dec. 1, 2004

(65) Prior Publication Data

US 2005/0137267 A1    Jun. 23, 2005

Related U.S. Application Data

(60) Provisional application No. 60/526,227, filed on Dec. 2, 2003.

(51) Int. Cl.
*B01F 3/12* (2006.01)
*B01F 3/22* (2006.01)
*C04B 14/00* (2006.01)

(52) U.S. Cl. ............... 516/33; 516/34; 516/22; 528/10; 528/20; 528/25; 524/588

(58) Field of Classification Search .................. 516/34, 516/22, 33; 528/10, 20, 25; 428/405
See application file for complete search history.

(56) References Cited

U.S. PATENT DOCUMENTS

| | | | |
|---|---|---|---|
| 4,522,958 A | 6/1985 | Das et al. ................... 523/212 |
| 4,526,910 A | 7/1985 | Das et al. ................... 523/220 |
| 4,677,004 A | 6/1987 | Das et al. ................. 427/407.1 |
| 4,950,502 A * | 8/1990 | Saam et al. .................. 516/34 |
| 5,185,037 A * | 2/1993 | Kaijou .......................... 516/34 |
| 5,252,655 A * | 10/1993 | Parker et al. ............... 524/430 |
| 5,348,760 A * | 9/1994 | Parker et al. .................. 427/9 |
| 5,543,173 A * | 8/1996 | Horn et al. .................. 427/212 |
| 5,885,485 A | 3/1999 | Brekau et al. |
| 5,902,226 A | 5/1999 | Tasaki et al. ................. 516/34 |
| 6,025,455 A | 2/2000 | Yoshitake et al. ............ 528/10 |
| 6,187,863 B1 * | 2/2001 | Wilt et al. .................. 525/100 |
| 6,387,519 B1 * | 5/2002 | Anderson et al. ........... 428/447 |
| 7,101,616 B2 * | 9/2006 | Arney et al. ................ 428/323 |
| 7,794,844 B2 * | 9/2010 | Dean et al. .................. 428/447 |
| 2004/0147029 A1 | 7/2004 | Adam |
| 2006/0188722 A1 * | 8/2006 | White et al. ................. 428/403 |
| 2007/0196661 A1 * | 8/2007 | Mayo et al. ............... 428/411.1 |
| 2009/0082514 A1 * | 3/2009 | Dean et al. .................. 524/493 |
| 2011/0040020 A1 * | 2/2011 | Dean et al. .................. 524/516 |

FOREIGN PATENT DOCUMENTS

| | | |
|---|---|---|
| EP | 0469180 A2 | 2/1992 |
| EP | 0699626 A1 | 3/1996 |
| GB | 1350584 | 4/1974 |

OTHER PUBLICATIONS

Lewis, Richard J., Sr. (2002—month unavailable). Hawley's Condensed Chemical Dictionary (14th Edition). John Wiley & Sons. Online version available at: http://knovel.com/web/portal/browse/display?_EXT_KNOVEL_DISPLAY_bookid=704&VerticalID=0.*

Lewis, Richard J., Sr. (2002) Hawley's Condensed Chemical Dictionary (14th Edition), John Wiley & Sons, Online @ http://knovel.com/web/portal/browse/display?_EXT_KNOVEL_DISPLAY_bookid=704&VerticalID=0, headword = hydrolysis, (Knovel Release Date: Sep. 4, 2003; downloaded Jun. 16, 2011), pp. 1.*

A. Kasseh and E. Keh: "Transfers of Colloidal Silica from Water into Organic Solvents of Intermediate Polarities" Journal of Colloid and Interface Science, vol. 197, No. 2, Jan. 15, 1998, pp. 360-369, XP002337791 Academic press, New York, NY, US.

* cited by examiner

*Primary Examiner* — Daniel S Metzmaier
(74) *Attorney, Agent, or Firm* — Steven W. Hays; Robert A. Diaz; Deborah M. Altman

(57) ABSTRACT

A method of preparing an organic sol of particles is provided. Steps include:
  a) providing a suspension of particles in an aqueous medium;
  b) adding an organic liquid to form an admixture where the concentration of particles in the admixture is less than or equal to 40 percent by weight;
  c) maintaining the admixture at a temperature and pressure and for a time sufficient to reduce the water content to less than 30 percent by weight while simultaneously adding a water-compatible organic liquid at a rate sufficient to maintain a concentration of particles in the admixture at less than or equal to 50 percent by weight; and
  d) adding at least one polymer while maintaining the admixture at a temperature and pressure and for a time sufficient to provide an organic sol of particles comprising 1 percent by weight or less of water.

19 Claims, No Drawings

COLLOIDAL PARTICLE SOLS AND METHODS FOR PREPARING THE SAME

This application claims the benefits of U.S. Provisional Application No. 60/526,227, filed Dec. 2, 2003.

FIELD OF THE INVENTION

The present invention relates to organic sols of colloidal particles, in particular, organic sols of silica which are stable without treatment of the particle surfaces and without the need for methanol stabilization. The invention further relates to methods of preparing the stable sols.

BACKGROUND OF THE INVENTION

The use of colloidal dispersions is well known in the art of coatings technology. Such dispersions, when incorporated into coatings, are known to improve mar and scratch resistance. They are also known to improve the storage stability of the coating compositions, to assist in rheology control of coatings during application to a substrate, and to improve orientation of pigment particles in coatings containing metallic and other effect pigments.

The favorable effects of the colloidal particles are due in large part to the very small size of the dispersed particles, which is less than the wavelength of visible light. This very small particle size prevents the particles from scattering light, thereby preventing haziness and adverse color effects that can occur from light scattering in an applied coating. The small particle size also promotes stability of the colloidal dispersions as well as the stability of the coating compositions that contain such dispersions. Ambient forces in the suspension such as electrostatic repulsion and Brownian motion of the suspending medium are sufficient to overcome the effects of gravity on the particles. The particles can remain in suspension indefinitely under normal conditions.

It is well known in the art that very small particles, in particular silica particles, can associate with one another, forming agglomerates. In coatings, these agglomerates act essentially as large particles, and therefore, the above-mentioned benefits of the small particle size may be lost. This tendency to agglomerate is believed to be due to the presence of polar moieties on the surface of the particles, for example Si—O—H moieties on silica particles, which can associate with the surfaces of adjacent particles. One way of preventing this interaction of polar groups on adjacent particles is to form the particles, or later suspend the particles, in an aqueous carrier. Water molecules in an aqueous carrier successfully compete with the neighboring particles for interaction with the polar groups. Although the stability of the suspension can be affected by factors such as pH and the presence of cations, particularly polyvalent cations, the incorporation of aqueous dispersions into aqueous coating compositions is relatively straightforward. However, in organic coatings or coatings with a high level of non-polar components, the particles have an increased tendency to agglomerate. Since many coating compositions are solventborne, it is desirable to provide a means of incorporating these colloidal dispersions of particles without agglomeration of the particles.

A number of approaches to preventing this agglomeration are known in the art. One approach is the reaction of the silica surface with silanes or silylating agents to yield silica powders dispersible in organic media. Also known is a method in which a non-polar organic solvent, cationic surface active agent, and an organic group-substituted silane are added to an aqueous dispersion of colloidal silica and the water removed by azeotropic distillation.

Another approach involves association of the polar groups of the silica particles with other polar or functional groups to prevent interaction of polar groups on adjacent silica particles. Such approaches include associating the polar moieties on the surface of the silica particles with low molecular weight alcohols such as methanol or propanol. The association may be through polar attraction or hydrogen bonding, or through the formation of chemical bonds.

Preparation of colloidal silica dispersions in solvents such as dipropyleneglycol monomethyl ether is known. In this method, a colloidal dispersion of silica particles is added slowly to the solvent while water is distilled off under vacuum at relatively low temperatures. A disadvantage of stabilization of silica particles by solvent alone is that when the colloidal silica is added to a coating composition and the coating composition is subsequently applied to a substrate and dried, some or all of the stabilizing solvent is evaporated. This may lead to destabilization of the silica suspension, haziness, and loss of other coating properties such as optimal appearance and mar resistance. Accordingly, it is desirable to provide a method to stabilize colloidal particles in such a way that they remain stably dispersed throughout the drying and curing of a coating.

SUMMARY OF THE INVENTION

The present invention is directed to a method of preparing a sol of particles suspended in an organic medium. The method comprises the following steps:

a) providing a suspension of particles in an aqueous medium;

b) adding an organic liquid compatible with the aqueous medium to form an admixture such that the concentration of particles in the admixture is less than or equal to 40 percent by weight based on the total weight of the admixture;

c) maintaining the admixture at a temperature and pressure and for a time sufficient to reduce the water content to less than 30 percent by weight based on the total weight of the admixture, while simultaneously adding a water-compatible organic liquid at a rate sufficient to maintain a concentration of particles in the admixture at less than or equal to 50 percent by weight based on the total weight of the admixture; and d) adding at least one polymer which is non-reactive with the water and the organic liquid in the admixture and optionally an organic liquid compatible with the liquid portion of the admixture while maintaining the admixture at a temperature and pressure and for a time sufficient to provide a sol of particles comprising 1 percent by weight or less of water based on the total weight of the admixture. The water-compatible organic liquids used in each of steps (b) (c) and (d) may be the same or different from each other.

Note that the order of process steps may be altered with the same results and additional steps may be added as necessary without departing from the scope of the invention. Note additionally that steps may be performed sequentially or two or more steps may be combined and performed simultaneously within the scope of the invention.

Sols prepared using the above method are also provided by the present invention.

DETAILED DESCRIPTION OF THE INVENTION

Other than in any operating examples, or where otherwise indicated, all numbers expressing quantities of ingredients, reaction conditions and so forth used in the specification and claims are to be understood as being modified in all instances by the term "about." Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In the first step of the method of the present invention, a suspension of particles in an aqueous medium is provided. By "aqueous medium" is meant a liquid medium that is primarily water. The aqueous medium may comprise minor amounts (i. e., up to 50 percent by weight) of other materials, either organic or inorganic, that are substantially fully miscible with or soluble in water. The term "suspension" or "sol" as used within the context of the present invention is believed to be a stable, two-phased translucent or opaque system in which the particles are in the dispersed phase and the aqueous medium defined above is the continuous phase. The concentration of the particles in the aqueous medium is, in general, not critical, but ordinarily the major portion of the aqueous suspension is water. The aqueous suspension usually contains from about 5 to 50, typically 10 to 40 percent by weight particle solids.

The particles can be formed from materials selected from at least one of polymeric organic materials, polymeric inorganic materials, nonpolymeric inorganic materials, and composite materials. By "polymer" is meant a polymer, including homopolymers and copolymers, and oligomers. "Polymeric inorganic materials" include polymeric materials having backbone repeat units based on one or more elements other than carbon. For more information, see James Mark et al, *Inorganic Polymers*, Prentice Hall Polymer Science and Engineering Series (1992) at page 5, which is specifically incorporated by reference herein. By "composite material" is meant a combination of two or more differing materials. The particles formed from composite materials typically, though not necessarily, have a hardness at their surface that is different from the hardness of the internal portions of the particle beneath the surface. For example, a particle can be formed from a primary material that is coated, clad, or encapsulated with one or more secondary materials to form a composite particle that has a softer surface. In another embodiment, particles formed from composite materials can be formed from a primary material that is coated, clad, or encapsulated with a different form of the same primary material. For information on particles useful in the method of the present invention, see G. Wypych, *Handbook of Fillers*, 2$^{nd}$ Ed. (1999) at pages 15-202, which are specifically incorporated herein by reference.

Typically the particles comprise inorganic oxides selected from at least one of metal oxides such as zinc oxide, silica, alumina, ceria, titania, zirconia, yttria, cesium oxide; metal nitrides such as boron nitride; metal carbides; metal sulfides such as molybdenum disulfide, tantalum disulfide, tungsten disulfide, and zinc sulfide; metal silicates including aluminum silicates and magnesium silicates such as vermiculite; metal borides; hydroxides; and metal carbonates. Mixtures of such materials can also be used.

The particles can comprise, for example, a core of essentially a single inorganic oxide such as silica in colloidal, fumed or amorphous form; alumina or colloidal alumina; titanium dioxide; cesium oxide; yttrium oxide; colloidal yttria; zirconia, e. g., in colloidal or amorphous form; and mixtures of any of the foregoing; or an inorganic oxide of one type upon which is deposited an organic oxide of another type.

Other nonpolymeric inorganic materials useful in the method of the present invention include graphite, metals such as molybdenum, platinum, palladium, nickel, aluminum, zinc, tin, tungsten, copper, gold, silver, alloys, and mixtures of metals.

Organic polymeric particles are limited to those that are insoluble in and impervious to the organic liquid in which they will be dispersed. By "impervious" is meant the organic particle will not be chemically altered or will not swell due to penetration of the liquid into the polymer network. A nonlimiting example of a suitable organic polymeric particle is self-condensed urea-formaldehyde polymer.

In one embodiment of the present invention, the particles are selected from at least one of silica, alumina, ceria, titania, zirconia, yttria, and cesium oxide In another embodiment of the present invention, the particles are selected from at least one of silica, ceria, alumina, and titania. In a particular embodiment of the present invention the particles comprise silica, which can be in the form of colloidal silica. The average diameter of the particles can range between 1 and 1000 nanometers prior to forming the sol, more often 5 to 250 nanometers.

The shape (or morphology) of the particles can vary depending upon the specific embodiment of the present invention and its intended application. For example, generally spherical morphologies such as solid beads, microbeads, or hollow spheres can be used, as well as particles that are cubic, platy, or acicular (elongated or fibrous). Additionally, the particles can have an internal structure that is hollow, porous, or void free, or a combination of any of the foregoing; e. g., a hollow center with porous or solid walls. For more information on suitable particle characteristics see H. Katz et al. (Ed.), *Handbook of Fillers and Plastics* (1987) at pages 9-10, which are specifically incorporated herein by reference.

It will be recognized by those skilled in the art that mixtures of one or more types of particles and/or particles having different average particle sizes may be incorporated into the sols in accordance with the method of the present invention to impart the desired properties and characteristics to the compositions in which they are to be used.

The particles may be obtained in a dry form and dispersed into an aqueous medium by any dispersion means known to those skilled in the art. Alternatively, the particles may be obtained from a supplier already dispersed in an aqueous carrier, providing a potential cost savings. Examples of ready-made dispersions include the Snowtex® line of products available from Nissan Chemical Industries, Ltd., and Nalco 1034, available from Nalco.

In one embodiment of the present invention, after step (a) and before step (b), a surface active treatment material may optionally be added to the suspension of particles. Suitable surface active treatment materials include polybutyl acrylate and BYK 337, available from BYK Chemie.

Step (b) of the method of the present invention comprises adding an organic liquid compatible (i. e., substantially miscible) with the aqueous medium used in step (a) to form an admixture. By "compatible" is additionally meant that the organic liquid is able to come into intimate contact with the particles which are suspended in the aqueous medium and is able to at least partially replace the physical and chemical associations between the particles and the aqueous medium. The "admixture" is typically in the form of a suspension of particles in the liquid medium. The organic liquid is selected so that during subsequent distillation of the admixture, water comprises at least part of the distillate, and so that during removal of water by distillation, the particles remain dispersed and do not flocculate. The organic liquid used in step (b) may be selected from at least one of glycol ethers, alcohols, esters, ketones, and aromatic hydrocarbons. Suitable specific examples include propylene glycol monomethyl ether, n-propanol, and n-butanol. In one embodiment of the present invention, the organic liquid used in step (b) comprises propylene glycol monomethyl ether. The concentration of particles in the admixture formed in step (b) is less than or equal to 40 percent by weight based on the total weight of the admixture, or between 15 and 40 percent by weight, or between 15 to 35 percent by weight, based on the total weight of the admixture.

Optionally, in one embodiment of the invention, a second surface active treatment material can be added with the organic liquid in step (b). This surface active treatment material may be added instead of the optional surface active treatment material mentioned above, in addition to that mentioned above, or not at all. The second surface active treatment material may be the same as or different from the surface active treatment material mentioned above.

In step (c) of the method of the present invention, the admixture is maintained at a temperature and pressure and for a time sufficient to reduce the water content to less than 30 percent, or less than 20 percent, or less than 15 percent by weight based on the total weight of the admixture. Simultaneously, a water-compatible organic liquid is added at a rate sufficient to maintain a concentration of particles in the admixture at less than or equal to 50 percent, or less than or equal to 35 percent by weight based on the total weight of the admixture. The water-compatible organic liquid may be the same as or different from the organic liquid used in step (b), and is additionally compatible with any other organic liquids used in previous or subsequent steps, as well as the polymer added in the following step (d) discussed immediately below.

Step (d) of the method of the present invention comprises adding at least one polymer that is non-reactive with the water and the organic liquid in the admixture. By "non-reactive" is meant that the polymer does not undergo a chemical reaction with or is not chemically altered by the water or organic liquid in the admixture. While the polymer is added to the admixture, the admixture is maintained at a temperature and pressure and for a time sufficient to provide a sol of particles comprising 5 percent by weight or less of water, typically 1 percent by weight or less of water based on the total weight of the admixture.

The polymer added in step (d) can form a homogeneous mixture with the organic liquids in the admixture, while maintaining the particles in stable suspension. The polymer may be selected from at least one of polysiloxane, polycarbonate, polyurethane, polyepoxide, acrylic, polyester, acetoacetate, and polyanhydride. Co polymers of the aforementioned polymers may be used as well. The polymers may be linear, branched, dendritic, or cyclic. In one embodiment of the present invention, the polymer comprises a polysiloxane.

In one embodiment of the present invention, the polysiloxane contains at least two Si atoms in the polymer backbone and comprises at least one of the following structural units:

$$R^1{}_n R^2{}_m SiO_{(4-n-m)2} \tag{I}$$

wherein $0<n<4$; $0<m<4$; $(4-n-m)/2$ equals a whole number; $2\leq(m+n)<4$; and each $R^1$ independently represents H, OH, a monovalent hydrocarbon group having 1 to 6 carbon atoms, or a monovalent siloxane group. Each $R^2$ independently represents a group having at least one reactive functional group; for example, each $R^2$ may independently represent a group having at least one reactive functional group selected from at least one of hydroxyl, carboxyl, isocyanate, blocked isocyanate, primary amine, secondary amine, amide, carbamate, urea, urethane, vinyl, unsaturated ester, maleimide, fumarate, anhydride, hydroxy alkylamide, and epoxy.

In a particular embodiment of the present invention, the polysiloxane comprises at least one of the following structures (II) or (III):

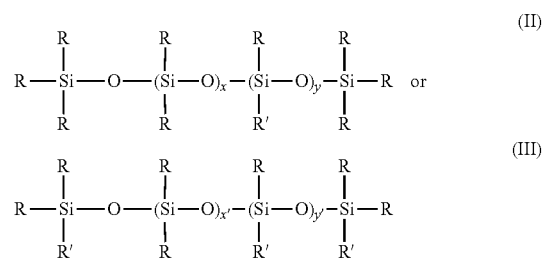

wherein x, x', and y' independently range from 0 to 75; y has a value of at least 1; each R independently represents at least one of H, OH, a monovalent hydrocarbon group having from 1 to 6 carbon atoms, and a monovalent siloxane group; and R' comprises $R^3$—X, wherein $R^3$ is selected from at least one of alkylene, oxyalkylene, alkylene aryl, alkenylene, oxyalkenylene, alkenylene aryl; and X represents a group having at least one reactive functional group selected from at least one of hydroxyl, carboxyl, isocyanate, blocked isocyanate, primary amine, secondary amine, amide, carbamate, urea, urethane, vinyl, unsaturated ester, maleimide, fumarate, onium salt, anhydride, hydroxy alkylamide, and epoxy. X often represents a group having at least one reactive functional group selected from at least one of hydroxyl, carboxyl, isocyanate, and carbamate. Most often, X represents a group having at least one reactive hydroxyl group.

Optionally, an organic liquid compatible with the liquid portion of the admixture of (d) may also be added along with the polymer, in order to maintain the concentration of particles at less than or equal to 40 percent or less than or equal to or 35 percent, by weight based on total weight of the admixture. The organic liquid may be the same as or different from the organic liquid used in previous steps.

As mentioned above, while the polymer is added to the admixture, the admixture is maintained at a temperature and pressure and for a time sufficient to provide a sol of particles comprising 5 percent or less, or 1 percent or less, by weight of water based on the total weight of the admixture.

The temperature and pressure may vary depending on the nature of the liquids used in the admixture, but typically the admixture is maintained at a temperature of ambient to 60° C.

and at a pressure of 10 mmHg to 300 mmHg. Note that in a separate embodiment of the present invention, separate steps (c) and (d) may be combined and performed as one step, and the polymer and organic liquid may be added together either as a preblended mixture or simultaneously as separate charges.

In one embodiment of the present invention, the method comprises an additional step (e) of adding an adjuvant organic liquid, which forms a homogeneous mixture with the liquid portion of the admixture. The adjuvant organic liquid may be the same as, in which case it may be water-compatible, or different from the organic liquid used in previous steps. The adjuvant organic liquid may alternatively be hydrophobic in character. By "hydrophobic" is meant that the organic liquid is substantially immiscible or incompatible with water. The adjuvant organic liquid used in step (e) can be selected from at least one of methyl amyl ketone, propylene glycol monomethyl ether, propylene glycol monophenyl ether, propylene glycol monoethyl ether, dipropylene glycol monomethyl ether, dipropylene glycol dimethyl ether, dipropylene glycol monobutyl ether, tripropylene glycol methyl ether, tripropylene glycol n-butyl ether, and tripropylene glycol t-butyl ether.

The present invention further provides the organic sols of particles prepared by the method described above. By "sol" is meant a mixture of one or more types of particles in a liquid, wherein the particles are larger than individual molecules, but are small enough that, in a normal earth surface gravitational field, they remain in uniform suspension indefinitely without the application of any external mechanical, thermal, or other force. Such sols are also referred to as colloidal solutions. See, for example, page 2 of *Sol-Gel Science: The Physics and Chemistry of Sol-Gel Processing*, C. Jeffrey Brinker, Academic Press, 1990.

Typically, the sols of the present invention may be prepared as demonstrated in the provided examples using temperature and pressure ranges and any of various solvents recited in this disclosure. General discussions on conventional preparation of sols may be found, for example, in chapter 4 of *The Chemistry of Silica*, Ralph K. Iler, Wiley Interscience, 1979.

The sols of the present invention may be used in coating compositions, such as automotive primers, electrodepositable primers, base coats, clear coats, and monocoats, as well as in coatings used in industrial and other applications. The sols may be easily added to a coating composition by simple mixing with other ingredients, using formulation techniques well known in the art.

The sols of the present invention improve various physical properties of coatings to which they are added, including mar and scratch resistance.

EXAMPLES

The following examples are intended to illustrate various embodiments of the invention, and should not be construed as limiting the invention in any way.

Example A

A total of 225 parts of Dowanol PM® (Propylene glycol methyl ether, available from Dow Chemical Co.) was added slowly at room temperature to 1482 parts of a 20% solution of colloidal silica in water available from Nissan Chemical as SNOWTEX O®. The mixture was heated to 50° C. in a suitable reactor equipped with temperature probe, addition funnel and vacuum distillation apparatus. When the mixture reached 50° C., the pressure in the reactor was reduced to about 60 to 100 mmHg to effect distillation, while an additional 1442 parts of DOWANOL PM® was added slowly to the reaction mixture. A total of 2162 parts of distillate was removed, bringing the contents of the reactor to about 30% solids. 4.9 parts of poly(butyl acrylate) were then added to the reaction mixture. 692 parts of the tetraol-functional siloxane were mixed with 296 parts of n-propyl alcohol and this mixture was then added to the contents of the reactor over about a 1 hour period. A total of about 256 parts of solvent were then removed by vacuum distillation. Finally, 343 parts of methyl amyl ketone were added to the reactor contents over about a 15 minute period and 343 parts of distillate were subsequently removed from the reaction mixture by vacuum distillation. The final reaction mixture was allowed to cool slightly, then poured into a suitable container. The final product was a slightly hazy solution that was found to have a measured solids of 48% and to have a Gardner-Holt viscosity of <A.

Example B

A total of 394 parts of DOWANOL PM® was added slowly at room temperature to 2595 parts of a 20% solution of colloidal silica in water available from Nissan Chemical as SNOWTEX O®. The mixture was heated to 50° C. in a suitable reactor equipped with temperature probe, addition funnel and vacuum distillation apparatus. When the mixture reached 50° C., the pressure in the reactor was reduced to about 60 to 100 mmHg to effect distillation, while an additional 2523 parts of DOWANOL PM® was added slowly to the reaction mixture. A total of 3783 parts of distillate was removed, bringing the contents of the reactor to about 30% solids. 0.86 parts of BYK 337® (available from Byk-Chemie) were then added to the reaction mixture. 1211 parts of the tetraol-functional siloxane were mixed with 519 parts of n-propyl alcohol and this mixture was then added to the contents of the reactor over about a 1 hour period. A total of about 462 parts of solvent were then removed by vacuum distillation. Finally, 588 parts of methyl amyl ketone were added to the reactor contents over about a 15 minute period and 588 parts of distillate were subsequently removed from the reaction mixture by vacuum distillation. The final reaction mixture was allowed to cool slightly, then poured into a suitable container. The final product was a slightly hazy solution that was found to have a measured solids of 47% and to have a Gardner-Holt viscosity of <A.

Example C

A total of 113 parts of DOWANOL PM® was added slowly at room temperature to 741 parts of a 20% solution of colloidal silica in water available from Nissan Chemical as SNOWTEX O®. The mixture was heated to a temperature of 50° C. in a suitable reactor equipped with temperature probe, addition funnel and vacuum distillation apparatus. When the mixture reached 50° C., the pressure in the reactor was reduced to about 60 to 100 mmHg to effect distillation, while an additional 720 parts of DOWANOL PM® was added slowly to the reaction mixture. A total of about 1204 parts of distillate was removed so that the contents of the reactor were then about 40% solids. 2.5 parts of poly(butyl acrylate) was then added to the reaction vessel. A pre-mixture of 346 parts of the tetraol-functional siloxane and 148 parts of n-propyl alcohol was then added to the contents of the reactor over about a 1 hour period. Finally, 171 parts of methyl amyl ketone were added to the reactor contents over a 15 minute period and 171 parts of distillate were then removed by vacuum distillation.

The final contents of the reactor were then cooled and poured into a suitable container. The final contents consisted of a slightly hazy solution that was found to have a measured solids of 48% and to have a Gardner-Holt viscosity of <A.

Example D

A total of 113 parts of DOWANOL PM® was added slowly at room temperature to 742 parts of a 20% solution of colloidal silica in water available from Nissan Chemical as SNOWTEX O®. The mixture was heated to a temperature of 50° C. in a suitable reactor equipped with temperature probe, addition funnel and vacuum distillation apparatus. When the mixture reached a temperature of 50° C., the pressure in the reactor was reduced to about 60 to 100 mmHg to effect distillation, while an additional 721 parts of DOWANOL PM® was added slowly to the reaction mixture. A total of 1081 parts of distillate was removed, bringing the contents of the reactor to about 30% solids. 2.5 parts of poly(Butyl acrylate) were then added to the reaction mixture. 198 parts of the tetraol-functional siloxane were mixed with 148 parts of n-propyl alcohol and this mixture was then added to the contents of the reactor over about a 1 hour period. A total of about 233 parts of solvent were then removed by vacuum distillation. Finally, 171 parts of methyl amyl ketone were added to the reactor contents over a period of about 15 minutes, and 171 parts of distillate were then removed from the reaction mixture by vacuum distillation. The final reaction mixture was then poured into a suitable container. The final contents were a slightly hazy solution that was found to have a measured solids of 48% and to have a Gardner-Holt viscosity of <A.

Example E

A total of 113 parts of Dowanol PM® was added slowly at room temperature to 742 parts of a 20% solution of colloidal silica in water available from Nissan Chemical as Snowtex O®. The mixture was heated to 50° C. in a suitable reactor equipped with temperature probe, addition funnel and vacuum distillation apparatus. When the mixture reached 50° C., the pressure in the reactor was reduced to about 60 to 100 mmHg to effect distillation, while an additional 721 parts of Dowanol PM® was added slowly to the reaction mixture. A total of 1081 parts of distillate was removed, bringing the contents of the reactor to about 30% solids. 198 parts of the tetraol-functional siloxane were mixed with 148 parts of n-propyl alcohol and this mixture was then added to the contents of the reactor over about 1 hour. A total of about 233 parts of solvent were then removed by vacuum distillation. Finally, 171 parts of methyl amyl ketone were added to the reactor contents over about 15 minutes and 171 parts of distillate were then removed from the reaction mixture by vacuum distillation. The final reaction mixture was then poured into a suitable container. The final contents were a slightly hazy solution that was found to have a measured solids of 48% and to have a Gardner-Holt viscosity of <A.

Whereas particular embodiments of this invention have been described above for purposes of illustration, it will be evident to those skilled in the art that numerous variations of the details of the present invention may be made without departing from the scope of the invention as defined in the appended claims.

Therefore, what is claimed is:

1. A method of preparing a sol of particles suspended in an organic medium comprising the following steps:

a) providing a suspension of particles in an aqueous medium;
b) adding an organic liquid compatible with the aqueous medium to form an admixture wherein the concentration of particles in the admixture is less than or equal to 40 percent by weight based on the total weight of the admixture;
c) maintaining the admixture at a temperature and pressure and for a time sufficient to reduce the water content to less than 30 percent by weight based on the total weight of the admixture while simultaneously adding a water-compatible organic liquid at a rate sufficient to maintain a concentration of particles in the admixture at less than or equal to 50 percent by weight based on the total weight of the admixture, wherein the water-compatible organic liquid is the same as or different from the organic liquid used in step (b); and
d) adding a polysiloxane which is non-reactive with the water and the organic liquid in the admixture and, optionally, an organic liquid compatible with the liquid portion of the admixture wherein the organic liquid is the same as or different from the organic liquid used in step (c); while maintaining the admixture at a temperature and pressure and for a time sufficient to provide a sol of particles comprising 1 percent by weight or less of water based on the total weight of the admixture; and wherein step d) follows step c); and
wherein the polysiloxane has at least three Si atoms and at least one of the following structural units (I):

$$R^1{}_n R^2{}_m SiO_{(4-n-m)/2} \qquad (I)$$

wherein each $R^1$ independently represents a monovalent hydrocarbon having 1 to 6 carbon atoms or a non-reactive monovalent siloxane;
wherein each $R^2$ independently is $R^3$—X, and wherein $R^3$ is selected from at least one of alkylene, oxyalkylene, alkylene aryl, alkenylene, oxyalkenylene, alkenylene aryl; and X represents a group having at least one reactive functional group selected from at least one of hydroxyl, carboxyl, blocked isocyanate, primary amine, secondary amine, amide, carbamate, urea, urethane, vinyl, unsaturated ester, maleimide, fumarate, onium salt, anhydride, hydroxy alkylamide, and epoxy; and
$0<n<4$; $0<m<4$; $(4-n-m)/2$ equals a whole number; and $2 \leq (m+n) < 4$.

2. The method of claim 1, wherein after step (a) and before step (b), a surface active treatment material is added to the suspension of particles.

3. The method of claim 1, wherein a surface active treatment material is added with the organic liquid in step (b).

4. The method of claim 1, further comprising an additional step (e) of adding an adjuvant organic liquid which forms a homogeneous mixture with the liquid portion of the admixture; wherein the adjuvant organic liquid is the same as or different from the organic liquid used in step (c).

5. The method of claim 4, wherein the adjuvant organic liquid used in step (e) is selected from at least one of methyl amyl ketone, propylene glycol monomethyl ether, propylene glycol monophenyl ether, propylene glycol monoethyl ether, dipropylene glycol monomethyl ether, dipropylene glycol dimethyl ether, dipropylene glycol monobutyl ether, tripropylene glycol methyl ether, tripropylene glycol n-butyl ether, and tripropylene glycol t-butyl ether.

6. The method of claim 1, wherein the particles are selected from at least one of metal oxides, inorganic oxides, metal nitrides, metal carbides, metal sulfides, metal silicates, metal borides, metal carbonates, and silica.

7. The method of claim 6, wherein the particles are selected from at least one of silica, alumina, ceria, titania, zirconia, yttria, and cesium oxide.

8. The method of claim 7, wherein the particles are selected from at least one of silica, ceria, alumina, and titania.

9. The method of claim 8, wherein the particles comprise silica.

10. The method of claim 9, wherein the particles comprise colloidal silica.

11. The method of claim 1, wherein the average diameter of the particles is between 1 and 1000 nanometers prior to forming the sol.

12. The method of claim 1, wherein the organic liquid used in step (b) is selected from at least one of glycol ethers, alcohols, esters, ketones, and aromatic hydrocarbons.

13. The method of claim 12, wherein the organic liquid used in step (b) comprises a glycol ether.

14. The method of claim 13, wherein the organic liquid used in step (b) comprises propylene glycol monomethyl ether.

15. The method of claim 1, wherein the particles are present in the admixture formed in step (b) at a concentration between 15 and 40 percent by weight based on the total weight of the admixture.

16. The method of claim 1, wherein each X independently represents a group having at least one reactive functional group selected from at least one hydroxyl, carboxyl, blocked isocyanate, primary amine, secondary amine, amide, carbamate, urea, urethane, vinyl, unsaturated ester, maleimide, fumarate, anhydride, hydroxy alkylamide, and epoxy.

17. The method of claim 1, wherein the polysiloxane comprises at least one of the following structures (II) or (III):

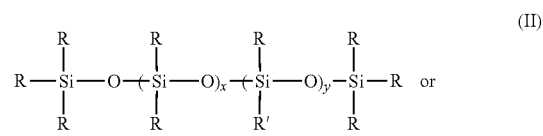

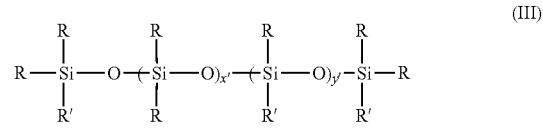

wherein x, x', and y' independently range from 0 to 75; y has a value of a least 1; each R independently represents at least one of a monovalent hydrocarbon having from 1 to 6 carbon atoms, and a non-reactive monovalent siloxane group; and R' is $R^3$—X, wherein $R^3$ is selected from at least one of alkylene, oxyalkylene, alkylene aryl, alkenylene, oxyalkenylene, alkenylene aryl; and X represents a group having at least one reactive functional group selected from at least one of hydroxyl, carboxyl, blocked isocyanate, primary amine, secondary amine, amide, carbamate, urea, urethane, vinyl, unsaturated ester, maleimide, fumarate, onium salt, anhydride, hydroxy alkylamide, and epoxy.

18. The method of claim 17, wherein X represents a group having at least one reactive functional group selected from at least one of hydroxyl, carboxyl, and carbamate.

19. The method of claim 17, wherein X represents a group having at least one reactive hydroxyl group.

* * * * *